United States Patent [19]

Nakata et al.

[11] Patent Number: 5,246,609

[45] Date of Patent: Sep. 21, 1993

[54] PROCESS FOR PREPARING FERROMAGNETIC FINE PARTICLES FOR MAGNETIC RECORDING

[75] Inventors: Kazuo Nakata, Moriyama; Masaharu Hirai, Shiga; Nobusuke Takumi, Kusatsu; Saburo Kato, Yokkaichi, all of Japan

[73] Assignee: Ishihara Sangyo Kaisha, Ltd., Osaka, Japan

[21] Appl. No.: 932,895

[22] Filed: Aug. 20, 1992

Related U.S. Application Data

[60] Division of Ser. No. 732,439, Jul. 18, 1991, abandoned, which is a continuation of Ser. No. 437,291, Nov. 16, 1989, abandoned, which is a continuation of Ser. No. 218,534, Jul. 12, 1988, abandoned.

[30] Foreign Application Priority Data

Jul. 13, 1987 [JP] Japan .................................. 62-174259
Aug. 4, 1987 [JP] Japan .................................. 62-194608

[51] Int. Cl.$^5$ ............................................. C04B 35/26
[52] U.S. Cl. ............................... 252/62.59; 252/62.58; 252/62.62; 252/62.63; 423/594
[58] Field of Search ............... 252/62.58, 62.63, 62.59, 252/62.62; 423/594

[56] References Cited

U.S. PATENT DOCUMENTS

4,786,430 11/1988 Mair .................. 252/62.58

FOREIGN PATENT DOCUMENTS

61-104602 5/1986 Japan .
61-266312 11/1986 Japan .
62-62505 3/1987 Japan .................. 252/62.63
62-275027 11/1987 Japan .

OTHER PUBLICATIONS

Patent Abstracts of Japan, unexamined applications, E Section, vol. 1, No. 20, Mar. 24, 1977, The Patent Office Japanese Government, p. 831 E76 *Kokai-No. 51-119 999 (Kyoto Ceramik K.K.)*.

Patent Abstracts of Japan, unexamined applications, P field, vol. 10, No. 32 Nov. 7, 1986, The Patent Office Japanese Government, p. 32 P513, *Kokai-No. 61-133 022 (Hitachi Maxell Ltd.)*.

Patent Abstracts of Japan, unexamined applications, P field, vol. 10, No. 2 Sep. 2, 1986 The Patent Office Japanese Government, p. 44 P 493, *Kokai-No. 61-82 329 (Hitachi Maxell Ltd.)*.

Patent Abstracts of Japan, unexamined applications, P field, vol. 9, No. 2, Jan. 8, 1985, The Patent Office Japanese Government, p. 46 P 325, *Kokai-No. 59-151 341 (Fuji Shashin Film K.K.)*.

*Primary Examiner*—Jack Cooper
*Attorney, Agent, or Firm*—Cushman, Darby & Cushman

[57] ABSTRACT

A process for producing ferromagnetic fine particles for magnetic recording which comprises preparing a starting material solution containing Ba, Fe and Me (Me representing at least one element selected from the group consisting of Co, Ti, Ni, Mn, Zr, Zn, Ge, Nb and V, the amount of which is 0.2 mol or less per mol of Fe) selected such that the molar ratio of Ba/(Fe+Me) is (1+m)/12 (m being a number of 0.1 to 2), mixing this starting material solution with an alkaline solution to form a coprecipitate-containing alkaline suspension, collecting and using the coprecipitate as precursor, or subjecting the coprecipitate-containing alkaline suspension to a heat treatment at a temperature below 250° C. to form a precursor, and calcining such precursor at 650°-950° C. to produce the hexagonal platelet Ba-ferrite particles. The process is further characterized in that a boron compound is contained in the precursor in an amount of (0.01 to 1) mmol (calculated as $B_2O_3$) per 12 mols of Fe and Me combined.

22 Claims, No Drawings

PROCESS FOR PREPARING FERROMAGNETIC FINE PARTICLES FOR MAGNETIC RECORDING

This is a division of U.S. application Ser. No. 07/732,439, filed Jul 18, 1991 which is a continuation of U.S. Ser. No. 437,291 filed Nov. 16, 1989, which is a continuation of U.S. Ser. No. 218,534 filed Jul. 12, 1988, all now abandoned.

BACKGROUND OF THE INVENTION

The present invention relates to a process for preparing ferromagnetic fine particles for magnetic recording comprising barium ferrite particles suited for high-density magnetic recording, especially perpendicular recording utilizing magnetization perpendicular to the recording medium plane.

Longitudinal recording, a recording system utilizing magnetization parallel to the recording medium in which the acicular magnetic particles such as the particles of $\gamma$-$Fe_2O_3$, cobalt-coated $\gamma$-$Fe_2O_3$, iron type metals, $CrO_2$ or the like are oriented parallel to the recording medium plane and remanent magnetization in that direction is utilized for recording, has been most popularly used for magnetic recording. With this recording system, however, it is difficult to realize desired high-density recording as this system involves the problem that an attempt to attain higher level of recording density tends to invite an increase of demagnetizing field in the recording medium to adversely affect its recording and reproducing performance especially in the short wavelength region. For overcoming such problem, attention has been focused recently on the so-called perpendicular recording system in which, in contrast with said longitudinal recording system, magnetization is effected in the direction perpendicular to the recording medium plane so as to decrease the demagnetizing field to thereby enable high-density recording.

As the recording medium for such perpendicular magnetic recording, there have been proposed those made by the alloy film method using Co-Cr alloy or the like whose application to practical use has been tried since long, and more recently the so-called coated type recording media prepared by coating a base film with a dispersion of hexagonal platelet ferrite particles such as barium ferrite particles in a binder resin. The coated-type recording media, like those for longitudinal recording, can be produced at high production efficiency and with economical advantages and are also excellent in durability, so that the realization of their practical application has been an urgent request.

The magnetic barium ferrite particles used for said perpendicular magnetic recording medium are usually composed of hexagonal platelet particles having an axis of easy magnetization in the direction perpendicular to the platelet plane, and they are required to have a large saturation magnetization and a coercive force (usually 200 to 2,000 Oe) suited for magnetic recording and coordinatable with the characteristics of the magnetic head used for recording and reproduction. As regards the size of said magnetic barium ferrite particles, generally the smaller the particle size, the less becomes the noise and the higher becomes the surface smoothness of the recording medium, hence the more advantageous for improving the S/N ratio. Usually a particle size of not more than $0.3\mu$, preferably not more than $0.2\mu$ is desired. Said particles are also required to have good dispersibility, orientability and packing density.

Various methods have been known for the production of barium ferrite particles to be used for magnetic recording media. Some typical examples of such methods are described below.

(1) Coprecipitation-calcination method

A mixed solution of compounds of $Ba^{2+}$ and $Fe^{3+}$ and a compound (or compounds) of Co, Ni, Zn, Ti, Sn, Zr, V, In or the like for controlling coercive force is prepared, and an alkali is added to this solution to cause formation of a coprecipitate and this coprecipitate is washed with water, dried and calcined. This method is advantageous in that the number of steps is relatively small, that the operations in the steps are easy to perform, and that the particles are small in single particle size and platelet ratio (diameter/thickness) are relatively easily obtainable. According to this method, however, interparticle sintering tends to occur in the course of calcination, resulting in an inevitable deterioration of dispersibility, orientability and packing density of the particles in the recording medium.

(2) Hydrothermal synthesis method

A suspension of the coprecipitate obtained by adding an alkali to the mixed solution used in the above method (1) is subjected to a hydrothermal treatment in an autoclave. This method is capable of producing the barium ferrite particles which are individually discrete from each other and have a relatively large platelet ratio and good dispersibility and orientability. But the produced particles are low in saturation magnetization ($\sigma s$), and when it is tried to increase their saturation magnetization, use of a higher temperature and a higher pressure is required and also the particle size tends to enlarge, so that the apparatus used for this method becomes costly. It is thus difficult with this method to economically produce the fine particles with good crystallinity.

(3) Hydrothermal synthesis-calcination method

In this method, a relatively low temperature (not higher than 250° C.) is used for the hydrothermal treatment of the suspension in the above hydrothermal synthesis method (2) to form the fine Ba-ferrite precursor particles and these particles are calcined. The Ba-ferrite particles obtained according to this method are fine in size and have a higher saturation magnetization than those obtainable by said hydrothermal synthesis method. In this method, however, there tends to take place interparticle sintering in the course of calcination and a consequent deterioration of dispersibility and orientability of the particles in the recording medium is inevitable.

(4) Glass crystallization method

A mixture of glass-forming materials $B_2O_3$, BaO and $Fe_2O_3$ and substituent components CoO and $TiO_2$ for controlling coercive force is melted by heating and then rolled and quenched to form an amorphous material and the latter is again heated. It is possible with this method to obtain the particles having a relatively high saturation magnetization, but the control of the treating conditions is very troublesome. Further, a step for pickling away the glass-forming materials is essential, and it is liable that said materials would remain in the final product even after pickling to cause a deterioration of magnetic properties of the product.

(5) The method for producing Ba-ferrite particles by using a boron compound are disclosed in Japanese Patent Kokai (Laid-Open) Nos. 61-104602 and 61-266312. The former discloses a method for producing acicular Ba-ferrite particles by treating acicular hydrous iron oxide or $\alpha$-Fe$_2$O$_3$ with a Ba compound and calcining the resulting material, in which B$_2$O$_3$ or Bi$_2$O$_3$ is used for promoting formation of the Ba-ferrite particles. The Ba-ferrite particles obtained according to this method are unsatisfactory in their saturation magnetization which is less than 50 emu/g. In the method of the latter patent, there are first prepared the hexagonal platelet particles of $\alpha$-FeOOH or $\alpha$-Fe$_2$O$_3$ by using an oxyalkylamine and a ferric salt and these particles are treated with a Ba salt and calcined to produce the Ba-ferrite particles retaining the hexagonal platelet shape, and in this method a low-melting oxide such as B$_2$O$_3$, P$_2$O$_5$, Bi$_2$O$_3$ or the like is added in a small amount at the time of calcination. The object and effect of this method is to retain the shape of hexagonal platelet particles like those of the fluxing agents such as chlorides. This method requires use of a large quantity of oxyalkylamine, which is 30 to 80 times by mole the amount of ferric salt, so that difficulties are involved in the treatment of the waste solution containing the organic substances.

Thus, any of the above-described methods has many problems to be overcome.

SUMMARY OF THE INVENTION

The present invention is envisioned to eliminate said problems of the conventional methods and to realize production of the Ba-ferrite platelet particles which are fine in size and suited for application to recording media for perpendicular magnetic recording, have a large saturation magnetization and are also excellent in dispersibility, orientability and packing density.

According to the present invention, there is provided a process for producing the fine ferromagnetic particles for magnetic recording which comprises preparing a starting material solution containing Ba, Fe and Me (Me representing at least one element selected from the group consisting of Co, Ti, Ni, Mn, Zr, Zn, Ge, Nb and V, the amount of which is 0.2 mol or less per mol of Fe) selected such that the molar ratio of Ba/(Fe+Me) will be (1+m)/12 (m being a number of 0.1 to 2), mixing an alkaline solution with said starting material solution to form a coprecipitate-containing alkaline solution, collecting and using said coprecipitate as precursor, and calcining said precursor at a temperature of 650° C. to 950° C. to form hexagonal platelet Ba-ferrite particles, characterized in that a boron compound is contained in said precursor in an amount (calculated as B$_2$O$_3$) of (0.01 to 1) mmol per 12 mols of Fe and Me combined.

DETAILED DESCRIPTION OF THE INVENTION

The present inventors have made many studies for establishing a process capable of economical production of fine Ba-ferrite platelet particles having a high saturation magnetization required for high-density recording by magnetic recording medium and improvement of reproduction output and also having excellent dispersibility, orientability and packing density. The present inventors have noted economical superiority of the coprecipitation-calcination method and hydrothermal synthesis-calcination method and carried on the studies for realizing industrial application of these methods. These studies by the present inventors have disclosed the facts that when a solution containing Ba, Fe and Me (Me representing at least one element selected from the group consisting of Co, Ti, Ni, Mn, Zr, Zn, Ge, Nb and V, the amount of which is 0.2 mol or less per mol of Fe) selected such that the molar ratio of Ba to the sum of Fe and Me will be 1/10–1/6, namely in excess of 1/12 which is the stoichiometric ratio of magnetoplumbite type Ba-ferrite, is used as the starting base solution, although such solution is effective for obtaining fine particles and for improving orientability, it could prove detrimental to further improvement of saturation magnetization, and that this problem can be avoided by calcining the precursor material in which a boron compound was contained in a specified amount as calculated based on the Ba content in excess of said stoichiometric ratio, by which it is possible to form fine Ba-ferrite platelet particles of uniform size suited for high-density recording by magnetic recording medium and for realizing high-output recording. The present invention was attained on the basis of such findings.

Thus, the present invention provides a process for producing ferromagnetic fine particles for magnetic recording which comprises preparing a starting material solution containing Ba, Fe and Me (Me representing at least one element selected from the group consisting of Co, Ti, Ni, Mn, Zr, Ge, Nb and V, the amount of which is 0.2 mol or less per mol of Fe) selected such that the molar ratio of Ba/(Fe+Me) is (1+m)/12 (m being a number of 0.1 to 2), mixing an alkaline solution with said base solution to form a coprecipitate-containing alkaline suspension, collecting and using said coprecipitate as precursor, and calcining said precursor at 650°–950° C. to form the hexagonal platelet Ba-ferrite particles, characterized in that a boron compound is contained in said precursor in an amount (calculated as B$_2$O$_3$) of (0.01 to 1) mmol per 12 mols of Fe and Me combined.

In the present invention, there is initially prepared an aqueous solution containing, in specified amounts, a Ba compound, an Fe compound and an Me compound serving as a metal element to substitute part of Fe for controlling coercive force (Me representing at least one element selected from the group consisting of Co, Ti, Ni, Mn, Zr, Zn, Ge, Nb and V, the amount of which is 0.2 mol or less per mol of Fe). Various types of water-soluble compounds of Ba, Fe and Me are usable, but the chlorides, nitrates and the like are preferred. The molar number (1+m) of Ba in said Ba compound is selected such that it will be in the range of 1.1–3 mols, preferably 1.2–2 mols, per 12 mols of Fe and Me combined. When the molar number of Ba is below said range, the intended effect of addition of a boron compound in this invention is not provided to a satisfactory degree, allowing formation of plenty of particle agglomerates or sintered particles. When the molar number of Ba exceeds said range, the particles size distribution tends to widen too much. The element Me used as a partial substitute for Fe comprises at least one of Co, Ti, Ni, Mn, Zr, Zn, Ge, Nb and V and may be used in an amount of 0.2 mol or less, preferably 0.17 mol or less per mol of Fe. Partial substitution of Fe with Co and Ti is preferred. Said starting material solution is contacted and mixed with an alkaline solution of NaOH, KOH, Na$_2$CO$_3$, K$_2$CO$_3$ or the like, preferably NaOH, to produce an alkaline suspension having a pH of 11 or higher in which a coprecipitate of said metal elements has been formed. The alkali concentration of said suspension should be at least 1 mol/l, preferably not less than 1.5 mol/l, more preferably not less than 2 mol/l in terms of free OH base concentration for forming the particles which are satisfactorily fine in size and have good dispersibility.

The alkaline suspension thus obtained is filtered, washed with water and then calcined to produce the Ba-ferrite particles, or said suspension is once heated to a temperature of up to about 250° C. in a reactor provided with a heating means or in a pressure vessel such as autoclave and maintained therein for about 0.5 to 5 hours. In this heat treatment, when heating is conducted at a temperature of up to about 60° C., the produced particles tend to have a small platelet ratio (diameter/thickness) and are excellent in packing density, and when heating is conducted at a temperature higher than about 60° C., especially above 100° C., the obtained particles tend to have a large platelet ratio, such particles having good orientability.

The Ba-ferrite precursor obtained from said treatment is washed with water and calcined.

In this invention, a boron compound is added so that it will be contained in the precursor in an amount of (0.01 to 1) m mol (calculated as $B_2O_3$) per 12 mols of Fe and Me combined. Boron compound may be added to any of said starting material solution, alkaline solution, alkaline suspension or precursor before calcination, but it is preferably added to the precursor before calcination. The amount of the boron compound added may be in the range of (0.01-1) m mol preferably (0.1-0.8) m mol, (calculated as $B_2O_3$), per 12 mols of Fe and Me combined. When the content of boron compound is below said range, the produced Ba-ferrite particles prove unsatisfactory in improvement of saturation magnetization. Also, there take place agglomeration of particles and interparticle sintering, and the effect of improving particle size distribution, dispersibility, packing density and orientability is unsufficient. When the boron compound content is greater than said range, there may take place coarsening of the Ba-ferrite particles and/or inclusion of non-magnetic $\alpha$-$Fe_2O_3$ in the produced particles. Boric acid, water-soluble borates such as sodium borate, potassium borate, etc., and boric ester or the like can be used as the boron compound in this invention. In case of adding a boron compound to the precursor before calcination, there can be employed, for instance, a method in which said suspension is separated, washed with water and made into a slurry of precursor, and to this slurry is added an aqueous solution or alcohol solution of a boron compound and evaporated to dryness, or a water-soluble boron compound is incorporated in the cake after water washing.

Said precursor containing a boron compound is calcined at a temperature of 650°–950° C., preferably 700°–850° C. for forming the desired platelet Ba-ferrite particles. When the calcination temperature is lower than said range, crystallization of ferrite particles does not proceed satisfactorily, resulting in a low saturation magnetization of the particles. Use of a higher calcination temperature than said range may invite coarsening of the Ba-ferrite particles or interparticle cohesion or sintering to form the agglomerates of particles which would badly impair the particle dispersibility in the preparation of coating material or other products. Said calcination can be accomplished by using various types of apparatuses such as a rotary kiln, fluidized-bed reactor, etc., usually for a time of about 0.5 to 5 hours. For further assurance of prevention of interparticle sintering, control of shape and improvement of magnetic properties, said precursor may be coated with a silicon or phosphorus compound, or a halide or sulfate of an alkali metal or alkali earth metal or various types of metal compounds, such as an Ni or Zn compound may be added to the precursor before calcination. The product obtained after said calcination treatment is subjected to washing with water or pickling with acetic acid, hydrochloric acid or the like to remove the impurities and contaminants to obtain the hexagonal platelet Ba-ferrite particles of the present invention.

According to the present invention, in the production of Ba-ferrite particles for magnetic recording by the coprecipitation-calcination method or hydrothermal synthesis-calcination method, it is possible to form the fine particles by using an excess amount of Ba and such particles can be substantially freed of agglomerates or sintered particles, bettered in orientability and dispersibility and further improved in saturation magnetization by relatively simple means. Also, the ferromagnetic fine particles obtained according to the present invention are suited for attaining higher level of high-density recording and higher output in magnetic recording, especially perpendicular magnetic recording. Thus, the present invention is of high industrial utility.

The present invention will be further illustrated below with reference to some examples thereof as well as some comparative examples.

EXAMPLE 1

150 ml of a 1 mol/l aqueous solution of $BaCl_2$, 1,0303 ml of a 1 mol/l aqueous solution of $FeCl_3$, 85 ml of a 1 mol/l aqueous solution of $CoCl_2$ and 85 ml of a 1 mol/l aqueous solution of $TiCl_4$ were mixed to prepare a starting material solution. This starting material solution was added to 583 ml of a 10 mol/l aqueous solution of NaOH to form a brown coprecipitate. This coprecipitate was filtered out and washed with water.

An aqueous solution of $H_3BO_3$ and an aqueous solution of NaCl were added to the obtained coprecipitate cake, and the mixed solution was repulped and evaporated to dryness at 110° C.

The amount of $H_3BO_3$ was selected so that the content of B compound in said coprecipitate would be 0.25 mol (calculated as $B_2O_3$) per 12 mols of Fe, Co and Ti combined, that is, the molar ratio thereof to Ba in excess of the stoichiometric amount of magnetoplumbite type Ba-ferrite will be 0.5. NaCl was added so that the NaCl/coprecipitate ratio will become 1/1 by weight. The thus treated coprecipitate was calcined at 800° C. for one hour to obtain the Ba-ferrite particles, and these particles were immersed in an aqueous solution of acetic acid, then filtered, washed with water and dried to obtain the ferromagnetic fine particles of the present invention. These particles are called here sample A.

EXAMPLE 2

The same procedure as Example 1 was repeated except that the mixed solution was adjusted so that the content of B compound in the coprecipitate would become 0.50 mol (calculated as $B_2O_3$) per 12 mols of Fe, Co and Ti combined, that is, the molar ratio thereof to Ba in excess of the stoichiometric amount of magnetoplumbite type Ba-ferrite would become 1.0 to obtain the ferromagnetic particles of this invention. These particles are called sample B.

EXAMPLE 3

By following the same procedure as Example 1 except that the coprecipitate-containing suspension obtained by adding the starting base solution to an NaOH solution was heated to 50° C. and maintained at this temperature for one hour, there were obtained the ferro-magnetic particles of the present invention. These particles are called sample C.

EXAMPLE 4

The procedure of Example 1 was followed except for use of 3,000 ml of the 10 mol/l aqueous solution of NaOH to obtain the ferromagnetic particles of a present invention. These particles are called sample D.

EXAMPLE 5

The procedure of Example 2 was followed except for use of 3,000 ml of the 10 mol/l aqueous solution of NaOH to obtain the ferromagnetic particles of a present invention. These particles are called sample E.

EXAMPLE 6

The procedure of Example 3 was followed except for use of 3,000 ml of the 10 mol/l aqueous solution of NaOH to obtain the ferromagnetic particles of a present invention. These particles are called sample F.

EXAMPLE 7

150 ml of a 1 mol/l aqueous solution of $BaCl_2$, 1,030 ml of a 1 mol/l aqueous solution of $FeCl_3$, 85 ml of a 1 mol/l aqueous solution of $CoCl_2$ and 85 ml of a 1 mol/l aqueous solution of $TiCl_4$ were mixed to prepare a starting material solution. This starting material solution was added to 538 ml of a 10 mol/l aqueous solution of NaOH to form an alkaline suspension containing a brown coprecipitate.

This suspension was put into a vessel provided with a heater and heated at 90° C. for 3 hours to produce a Ba-ferrite precursor, which was filtered out and washed with water.

An aqueous solution of $H_3BO_3$ and an aqueous solution of NaCl were added to the obtained cake of Ba-ferrite precursor and the mixed solution was repulped and evaporated to dryness at 110° C. The amount of $H_3BO_3$ was selected so that the content of B compound in said precursor would become 0.26 mol (calculated as $B_2O_3$) per 12 mols of Fe, Co and Ti combined, that is, the molar ratio of the boron compound (calculated as $B_2O_3$) to Ba in excess of the stoichiometric amount of magnetoplumbite type Ba-ferrite would become 0.52 in said precursor. NaCl was added so that the NaCl/precursor ratio would become 1/1 by weight.

The thus treated Ba-ferrite precursor was calcined at 800° C. for one hour to form the Ba-ferrite particles, and these particles were immersed in an aqueous solution of acetic acid, then filtered out, washed with water and dried to obtain the ferromagnetic fine particles of the present invention. These particles are called sample G.

EXAMPLE 8

The procedure of Example 7 was followed except that the amount of the 10 mol/l aqueous solution of NaOH used for obtaining an alkaline suspension was changed from 583 ml to 3,000 ml to obtain the ferromagnetic fine particles of the present invention. These particles are called sample H.

EXAMPLE 9

The procedure of Example 7 was followed except that there was used, 3,000 ml of a 10 mol/l aqueous solution of NaOH, that the alkaline suspension was put into an autoclave and heated at 125° C., and that the content of the B compound in the Ba-ferrite precursor was adjusted so that it would be 0.17 mol (calculated as $B_2O_3$) per 12 mols of Fe, Co and Ti combined, that is, the molar ratio thereof to Ba in excess of the stoichiometric amount of magnetoplumbite type Ba-ferrite would be 0.33, to obtain the ferromagnetic fine particles of the present invention. These particles are called sample J.

EXAMPLE 10

The procedure of Example 9 was followed except that the content of the B compound was adjusted to be 0.33 mol (calculated as $B_2O_3$) per 12 mols of Fe, Co and Ti combined, that is, the molar ratio thereof to excess Ba would become 0.67 to obtain the ferromagnetic particles of the present invention. These particles are called sample K.

EXAMPLE 11

By following the procedure of Example 7 except that the amount of the 1 mol/l aqueous solution of $BaCl_2$ and the amount of the 10 mol/l aqueous solution of NaOH used for forming an alkaline suspension were 200 ml and 3,100 ml, respectively, that the alkaline suspension was put into an autoclave and heated at 125° C., and that the content of the B compound in the Ba-ferrite precursor was adjusted to be 0.67 mol (calculated as $B_2O_3$) per 12 mols of Fe, Co and Ti combined, that is, the molar ratio thereof to excess Ba would become 0.67, there were obtained the ferromagnetic particles of the present invention. These particles are called sample L.

EXAMPLE 12

By following the procedure of Example 7 except that there were used 1,040 ml of the 1 mol/l aqueous solution of $FeCl_3$, 80 ml of the 1 mol/l aqueous solution of $CoCl_2$, 80 ml of the 1 mol/l aqueous solution of $TiCl_4$ and 3,000 ml of the 10 mol/l aqueous solution of NaOH for preparing an alkaline suspension, that the alkaline suspension was put into an autoclave and heated at 110° C. to produce a Ba-ferrite precursor, that an aqueous solution of $H_3BO_3$, an aqueous solution of NaCl and an aqueous solution of $ZnCl_2$ were added to the precursor and the mixed solution was repulped and evaporated to dryness at 110° C. so that the content of B compound in the Ba-ferrite precursor would be 0.26 mol (calculated as $B_2O_3$) per 12 mols of Fe, Co and Ti combined, that is, the molar ratio thereof to Ba in excess of the stoichiometric amount would become 0.52 and that Zn was contained in an amount of 1.09% by weight based on said Ba-ferrite precursor, there were obtained the ferromagnetic particles of the present invention. These particles are called sample M.

COMPARATIVE EXAMPLE 1

By following the procedure of Example 1 except that no aqueous solution of $H_3BO_3$ was used, there were obtained the ferromagnetic particles, which are called sample N.

COMPARATIVE EXAMPLE 2

By following the procedure of Example 3 except that no aqueous solution of $H_3BO_3$ was used, there were obtained the ferromagnetic particles, which are called sample P.

COMPARATIVE EXAMPLE 3

By following the procedure of Example 4 except that no aqueous solution of $H_3BO_3$ was used, there were obtained the ferromagnetic particles, which are called sample Q.

COMPARATIVE EXAMPLE 4

By following the procedure of Example 6 except that no aqueous solution of $H_3BO_3$ was used, there were obtained the ferromagnetic particles, which are called sample R.

COMPARATIVE EXAMPLE 5

By following the procedure of Example 8 except that no boron compound was used, there were obtained the ferromagnetic particles, which are called sample S.

COMPARATIVE EXAMPLE 6

By following the procedure of Example 9 except that no boron compound was used, there were obtained the ferromagnetic particles, which are called sample T.

Each of said samples A–T was subjected to the measurements of average particle diameter (by electron microscopy), coercive force (Hc) and saturation magnetization ($\sigma s$) by the conventional methods, and the measured values were shown in the column of "Particle properties" of Table 1. X-ray diffraction showed that all of the specimens obtained in the Examples and Comparative Examples had a magnetoplumbite crystal phase.

Magnetic coating materials were prepared from the following composition:

| | |
|---|---|
| Magnetic particles | 100 parts by weight |
| Vinyl chloride-vinyl acetate copolymer resin | 16.2 parts by weight |
| Surface active agent | 4 parts by weight |
| Methyl ethyl ketone | 186 parts by weight |

Each of these magnetic coating materials was coated on a polyester film, and the coated film was subjected to an orientation treatment in the direction perpendicular to the coating surface to make a recording medium.

The coercive force (Hc⊥) and squareness ratio (SQ⊥) in the direction vertical to the coating surface and the orientation ratio (OR) of each recording medium were determined and shown in the column of "Tape properties" of Table 1.

TABLE 1

| Sample | Composition of starting base solution Ba/Fe/Co/Ti (molar ratio) | Ba/Fe + Me (molar ratio) | m | Alkaline suspension Free OH (mol/l) | Heating temp. (°C.) | Content of B Compound (mol ratio) $\frac{B_2O_3}{Fe + Me}$ | $\frac{B_2O_3}{m \cdot BaO}$ | Particle properties Hc (Oe) | $\sigma s$ (emu/g) | Particle diameter ($\mu$) | Tape properties Hc⊥ (Oe) | SQ⊥ | OR |
|---|---|---|---|---|---|---|---|---|---|---|---|---|---|
| Example | | | | | | | | | | | | | |
| A | 1.5/10.3/0.85/0.85 | 1.5/12 | 0.5 | 1.0 | — | 0.25/12 | 0.5 | 805 | 56.2 | 0.06 | 975 | 0.599 | 1.08 |
| B | " | " | " | " | — | 0.50/12 | 1.0 | 1010 | 58.0 | 0.07 | 1175 | 0.601 | 1.17 |
| C | " | " | " | " | 50 | 0.25/12 | 0.5 | 915 | 56.8 | 0.10 | 1090 | 0.61 | 1.14 |
| D | " | " | " | 6.0 | — | " | 0.5 | 705 | 57.6 | 0.05 | 860 | 0.559 | 0.86 |
| E | " | " | " | " | — | 0.50/12 | 1.0 | 655 | 58.0 | 0.06 | 790 | 0.595 | 1.05 |
| F | " | " | " | " | 50 | 0.25/12 | 0.5 | 640 | 58.0 | 0.07 | 790 | 0.611 | 1.04 |
| G | " | " | " | 1.0 | 90 | 0.26/12 | 0.52 | 828 | 57.7 | 0.075 | 1010 | 0.631 | 1.28 |
| H | " | " | " | 6.0 | " | " | " | 770 | 56.9 | 0.075 | 940 | 0.647 | 1.18 |
| J | " | " | " | " | 125 | 0.17/12 | 0.33 | 655 | 55.0 | 0.080 | 750 | 0.698 | 1.26 |
| K | " | " | " | " | " | 0.33/12 | 0.33 | 633 | 56.0 | 0.09 | 725 | 0.698 | 1.34 |
| L | 2.0/10.3/0.85/0.85 | 2.0/12 | 1 | " | " | 0.67/12 | 0.67 | 433 | 55.7 | 0.12 | 550 | 0.680 | 1.46 |
| M | 1.5/10.4/0.8/0.8 | 1.5/12 | 0.5 | " | 110 | 0.26/12 | 0.52 | 505 | 59.4 | 0.10 | 640 | 0.646 | 1.18 |
| Comparative Example | | | | | | | | | | | | | |
| N | 1.5/10.3/0.85/0.85 | " | " | 1.0 | — | 0 | 0 | 665 | 48.8 | 0.10 | 780 | 0.503 | 0.903 |
| P | " | " | " | " | 50 | " | " | 695 | 49.8 | 0.07 | 790 | 0.518 | 0.952 |
| Q | " | " | " | 6.0 | — | " | " | 705 | 51.1 | 1)— | 800 | 0.435 | 0.733 |
| R | " | " | " | " | 50 | " | " | 685 | 51.2 | 1)— | 810 | 0.478 | 0.787 |
| S | " | " | " | " | 90 | " | " | 725 | 50.9 | 0.065 | 860 | 0.547 | 0.952 |
| T | " | " | " | " | 125 | " | " | 690 | 51.3 | 0.075 | 750 | 0.673 | 1.09 |

Particle diameter was measured by electron microscopy. Samples of the Comparative Examples had many agglomerates and sintered particles, and it was impossible to measure particle diameter of the samples indicated by Note 1) in the table.

As seen from the results shown in Table 1, the magnetic Ba-ferrite particles of the present invention obtained by incorporating a boron compound in a precursor containing excess Ba and produced by mixing a starting base solution containing Ba-ferrite type metal elements and an alkaline solution have few agglomerates and sintered particles, show excellent orientability and dispersibility and are capable of markedly increasing saturation magnetization and also fine in particle size.

On the other hand, the ferromagnetic particles obtained in the same way as Comparative Examples 1 and 2 by regulating the molar ratio of Ba:(Fe+Me) in the starting material solution to 1:12 which is the stoichiometric ratio of magnetoplumbite type Ba-ferrite were equal to the particles of the present invention in saturation magnetization but had many agglomerates and sintered particles and were also poor in orientability and dispersibility. Also, the ferromagnetic particles obtained in the same way as Example 1 by treating the coprecipitate formed from said starting base solution with an aqueous solution of $H_3BO_3$ contained non-magnetic $\alpha\text{-}Fe_2O_3$ which was responsible for low saturation magnetization of these particles. Further, in the process of Comparative Example 6, when the Ba-ferrite precursor containing Ba in excess of stoichiometric amount, obtained from said heat treatment, was filtered, washed and repulped with water to form a slurry and this slurry, after adjusted to a neutral pH with hydrochloric acid, was filtered out, dried and calcined, there was noted an improvement of saturation magnetization but orientability was greatly deteriorated.

What is claimed is:

1. A process for producing ferromagnetic fine particles for magnetic recording, comprising the steps of:
   preparing a starting material solution containing Ba, Fe and Me (Me representing at least one element selected from the group consisting of Co, Ti, Ni, Mo, Mn, Zr, Zn, Ge, Nb and V, the amount of which is 0.2 mol or less per one mol of Fe) selected so that the molar ratio of Ba/(Fe+Me) is $(1+m)/12$ (m being a number from 0.1 up to 2),
   mixing this starting material solution with an aqueous alkaline solution to form a coprecipitate-containing alkaline suspension having a free OH concentration of at least 1 mol/l,
   collecting and using said coprecipitate as precursor,
   calcining said precursor at 650°–950° C. in the presence of an additive selected from the group consisting of alkali metal halides, alkali metal sulfates, alkaline earth metal halides and alkaline earth metal sulfates, to obtain hexagonal platelet Ba-ferrite particles, wherein said precursor contains a boron compound in an amount of (0.01 to 1) m mol (calculated as $B_2O_3$) per 12 mol of Fe and Me combined.

2. The process according to claim 1, wherein the molar ratio of Ba/(Fe+Me) is 1.2–2/12.

3. The process according to claim 1, wherein the amount of Me is 0.17 mol or less per mol of Fe.

4. The process according to claim 1, wherein the free OH group concentration in the alkaline suspension is 2 mol/l or above.

5. The process according to claim 1, wherein the amount of the boron compound is (0.1 to 0.8) m mols calculated as $B_2O_3$ per 12 mols of Fe and Me combined.

6. The process according to claim 1, wherein the boron compound is a water- or alcohol-soluble compound.

7. The process according to claim 1, wherein the boron compound containing precursor is formed by adding the boron compound to the precursor.

8. The process according to claim 7, wherein an aqueous or alcohol solution of boron compound is added to a slurry of the precursor.

9. The process according to claim 7, wherein a water-soluble boron compound is incorporated in a cake of the precursor.

10. The process according to claim 1, wherein the calcination temperature is 700° to 850° C.

11. The process according to claim 1, wherein the precursor is the one obtained by subjecting the coprecipitate-containing alkaline suspension to a heat treatment at a temperature up to 250° C.

12. The process according to claim 11, wherein the molar ratio of Ba/(Fe+Me) is 1.2–2/12.

13. The process according to claim 11, wherein the amount of Me is 0.17 mol or less per mol of Fe.

14. The process according to claim 11, wherein the free OH group concentration in the alkaline suspension is 2 mol/l or above.

15. The process according to claim 11, wherein the heat-treating temperature of the alkaline suspension is 60° to 250° C.

16. The process according to claim 11, wherein the heat-treating temperature of the alkaline suspension is up to 60° C.

17. The process according to claim 11, wherein the amount of the boron compound added is (0.1 to 0.8) m mols (calculated as $B_2O_3$) per 12 mols of Fe and Me combined.

18. The process according to claim 11, wherein the boron compound is a water- or alcohol-soluble compound.

19. The process according to claim 12, wherein the boron compound containing precursor is formed by adding the boron compound to the precursor.

20. The process according to claim 19, wherein an aqueous or alcohol solution of a boron compound is added to a slurry of the precursor.

21. The process according to claim 19, wherein a water-soluble boron compound is incorporated in a cake of the precursor.

22. The process according to claim 19, wherein the calcination temperature is 700° to 850° C.

* * * * *